(12) United States Patent
Flynn

(10) Patent No.: US 7,002,629 B2
(45) Date of Patent: Feb. 21, 2006

(54) CCD IMAGE DETECTOR AND METHOD OF OPERATING A CCD AS AN IMAGE DETECTOR

(75) Inventor: David J. Flynn, Sandy Hook, CT (US)

(73) Assignee: Goodrich Corporation, Charlotte, NC (US)

( * ) Notice: Subject to any disclaimer, the term of this patent is extended or adjusted under 35 U.S.C. 154(b) by 887 days.

(21) Appl. No.: 09/938,093

(22) Filed: Aug. 23, 2001

(65) Prior Publication Data

US 2003/0038888 A1 Feb. 27, 2003

(51) Int. Cl.
*H04N 5/335* (2006.01)
*H04N 3/14* (2006.01)

(52) U.S. Cl. .................. 348/312; 348/317; 348/294
(58) Field of Classification Search .............. 348/311, 348/312, 314, 316, 317, 318, 319, 324, 294; 250/208.1; 257/231, 232
See application file for complete search history.

(56) References Cited

U.S. PATENT DOCUMENTS

| 5,438,365 A | * | 8/1995 | Yamashita et al. .......... 348/297 |
| 5,572,256 A | * | 11/1996 | Egawa et al. ............... 348/296 |
| 5,781,234 A | * | 7/1998 | David et al. ................ 348/319 |
| 6,115,065 A | * | 9/2000 | Yadid-Pecht et al. ....... 348/308 |
| 6,252,627 B1 | * | 6/2001 | Frame et al. ............... 348/311 |
| 6,339,213 B1 | * | 1/2002 | Harada .................... 250/208.1 |
| 6,529,242 B1 | * | 3/2003 | Panicacci ................... 348/308 |
| 6,809,766 B1 | * | 10/2004 | Krymski et al. ............ 348/296 |

* cited by examiner

Primary Examiner—Thai Tran
Assistant Examiner—Justin Misleh
(74) Attorney, Agent, or Firm—Peter Hernandez; Calfee, Halter & Griswold LLP

(57) ABSTRACT

A CCD image detector includes an image area array, a storage area array, a buffer area array, and a readout shift register, all of which being controlled by a timing controller through separate and independent clock signals. The timing controller controls the transfer of the charge content of an image from the image area array to the storage area array and batch transfers of the charge content of the image from the storage area array to the buffer area array in bands of adjacent rows of gates. Between such batch transfers of bands, the timing controller controls the transfer of the charge content of the band stored in the buffer area array to the readout shift register one row of gates at a time at a slow rate to permit the charge content of each row to be shifted out from the readout register. The batch transfers of bands has the effect of minimizing slow rate transfers from the storage area array which reduces the impact of degraded charge transfer efficiency on performance of the image detector.

15 Claims, 5 Drawing Sheets

CCD IMAGE DETECTOR AND METHOD OF OPERATING A CCD AS AN IMAGE DETECTOR

BACKGROUND OF THE INVENTION

The present invention relates to charge coupled devices (CCDs) for use in image collection, storage and transfer, in general, and more particularly, to a CCD image detector including a buffer area array separate from an image area array and a storage area array, the buffer area array being controlled independently of the image and storage area arrays to transfer its charge contents to a read out register of the CCD, and a method of operating the same.

Charge coupled devices or CCDs are arrays of semiconductor gates formed on a substrate of an integrated circuit or chip. The gates of the CCD are operative to individually collect, store and transfer charge. When used in image applications, the charge collected and stored in each gate of the array represents a picture element or pixel of an image. A typical CCD detector used for image applications is shown in the diagram of FIG. 1 and includes an image collection area 10, an image storage area 12, and a register 14 for reading out serially the pixel charges of an image one line at a time. Each of the aforementioned two areas 10 and 12 may include an array of 512×512 CCD gates, i.e. 512 lines or rows of 512 gates per row, for example. The readout register 14 includes a line of CCD gates and operates as a shift register shifting out serially the charge contents or image pixel information of a line of the collected image. Gates of the image area 10 may be operated by clock signals 16 to transfer in parallel the charge contents of the gates of one row to another vertically downward in the direction of the arrow 18. Similarly, gates of the storage area 12 are operated by clock signals 20 to transfer in parallel the charge contents of the gates of one row to another vertically downward. And, the gates of the horizontal or readout register 14 are operated by the clock signal 22 to shift out serially from right to left the charge contents of its gates over a signal line 24.

In operation, an image detector CCD gate array may be initially purged of all charge contents, then an image is collected in the form of charges in the individual gates of the image array during a predetermined integration period which may be on the order of 100 to 250 milliseconds, for example. Thereafter, the clock signals 16 and 20 operate together to transfer the current charge contents of the gates of the image area 10 to the gates of the storage area 12 line by line. This transfer process may take on the order of 512 clock pulses of approximately 3 microseconds each, for example. Once the charges representing the pixels of the collected image are stored in the storage area 12, the clock signal 20 may continue to shift the charge contents of the gates of the storage area 12 to the readout register 14 line by line which will take considerably longer because after each new line of charge contents is transferred to the readout register 14, the clock signal 22 clocks out the charge contents (pixel information) serially which may take 512 clock pulses of on the order of 1 microsecond each, for example. So, there will be a delay of 512 microseconds between each line transfer of 512 line transfers of the storage area 12 for readout purposes.

While the foregoing described example used specific values for integration and transfer times, it is understood that these times are application dependent and may change from one application to another. Also, there are other possible methods of clocking a CCD. For example, in some image systems, there is no separate purge cycle to define the start of an integration period. Rather, a frame transfer defines the start of integration which occurs simultaneously with burst/readout cycles.

In band transfer applications of CCD detectors, only one or more bands of adjacent rows of image information or charge content need be read out from the CCD. For example, if a band of rows is 16 rows and there are six mutually exclusive bands, then the storage area 12 may be operated by the clock signal 20 to burst through the rows thereof at a rate of 1–3 microsecond per row until the first band of rows is stored in a like number of rows adjacent the read our register 14. Thereafter, the storage area 12 may be operated to clock each row of the first band into the read out register 14 with a delay of 512 microseconds per row, for example. Once the rows of the first band are clocked out of the CCD, then the storage area 12 may be operated to burst until the second band of rows is stored in the rows adjacent read out register 14 and the process repeated for the remaining five designated bands. In this case, the transfer and readout speed of the CCD is improved by a factor of at least five since the storage area 12 is clocked slowly only approximately 102 times and rapidly clocked for the remainder of lines.

When these CCD detectors are used in an environment unprotected from radiation, like in space and in some cases, in nuclear environments, for example, high energy proton and neutron radiation may penetrate the CCD array and cause phosphorous vacancy (p-v) traps in one or more gates of the CCD where unwanted charge in the form of electrons may be stored. This trapped charge may be released in an exponential manner that can be characterized by a temperature dependent release time constant $\tau_R$ which may be on the order of 270 microseconds at 0° C., for example. Since the p-v capture time is very short, the CTE, which is a measure of how much charge is transferred, is independent of how the CCD is clocked. Where the p-v trapped charge is released does depend on the manner in which the CCD is clocked to transfer charge from gate to gate in relation to $\tau_R$. In other words, if the CCD is clocked at a rapid rate like during frame transfers from the image area to the storage area or during bursting from one band to another, for example, so that the each clock pulse is much shorter than $\tau_R$, then the charge released from the trap will be spread uniformly over the charge contents of many gates and may easily be removed by thresholding, for example. On the other hand, if the CCD is clocked slowly, like when data is being readout through register 14, for example, so that the clock period or delay is longer than $\tau_R$, then most of the trapped charge will be released to the next charge content being shifted through the gate. This condition will result in a shift in the image centroid in a direction opposite to the transfer direction and a degradation of the high frequency modulation transfer function (MTF) of the CCD detector. The shift in the centroid position will increase linearly with the number of slow (period>$\tau_R$) clock pulses required to read out the image.

The present invention improves the likelihood of trapped charge in one or more gates of the CCD being released over a multiplicity of charge contents (pixel information) during a charge transfer process, thus, reducing the risk of occurrence of the aforementioned problems.

SUMMARY OF THE INVENTION

In accordance with one aspect of the present invention, a charge coupled device (CCD) image detector comprises: an image area of an array of rows of gates, each gate of the image area array being operative to collect and store a charge content representative of a picture element (pixel) of an image, the rows of gates of the image area being operative concurrently by a first clock signal to transfer in parallel the charge contents of the gates of each row to the gates of an adjacent row in a predetermined direction through the image area; a storage area of an array of rows of gates, each gate of the storage area array being operative to store a charge content, the rows of gates of the storage area being operative concurrently by a second clock signal to transfer in parallel the charge contents of the gates of each row to the gates of an adjacent row in the predetermined direction through the storage area, the storage area array of rows disposed in the CCD detector such that a first row of the image area array of rows is adjacent a last row of the storage area array of rows to accommodate a transfer in parallel of the charge contents of the gates of the first row of the image area to the gates of the last row of the storage area, wherein the image and storage areas are operative by the first and second clock signals, respectively, to transfer the charge contents of the rows of the image area array to rows of the storage area array; a buffer area of an array of rows of gates, each gate of the buffer area array being operative to store a charge content, the rows of gates of the buffer area being operative concurrently by a third clock signal to transfer in parallel the charge contents of the gates of each row to the gates of an adjacent row in the predetermined direction through the buffer area, the buffer area array of rows disposed in the CCD detector such that a first row of the storage area array of rows is adjacent a last row of the buffer area array of rows to accommodate a transfer in parallel of the charge contents of the gates of the first row of the storage area to the gates of the last row of the buffer area, wherein the storage and buffer areas are operative by the second and third clock signals, respectively, to transfer the charge contents of the rows of the storage area array to rows of the buffer area array; and a readout register of a row of gates, each gate of the readout register being operative to store a charge content, the readout register disposed in the CCD detector such that a first row of the buffer area array of rows is adjacent the row of the readout register to accommodate a transfer in parallel of the charge contents of the gates of the first row of the buffer area to the gates of the readout register as controlled solely by the third clock signal, the row of gates of the readout register being operative concurrently by a fourth clock signal to transfer serially the charge contents of the gates thereof through the register in a predetermined direction to an output signal line.

In accordance with another aspect of the present invention, a method of operating a charge coupled device (CCD) as an image detector comprises the steps of: (a) collecting and storing charge content in gates of an image area array of rows of gates for a predetermined period of time, the charge content of the gates of the image area array representative of a picture elements (pixels) of an image frame; (b) transferring the stored charge contents of the image area array to a storage area array of rows of gates controlled by a burst of first clock pulses wherein each pulse controls the transfers in parallel of the stored charge contents of gates between adjacent rows through the image and storage areas in a predetermined direction; (c) transferring the charge contents of a predetermined number of adjacent rows of the storage area array to a like number of adjacent rows of a buffer area array of rows of gates controlled by a burst of second clock pulses wherein each pulse controls the transfers in parallel of the stored charge contents of gates between adjacent rows through the storage and buffer areas in the predetermined direction; (d) transferring in parallel the charge contents of adjacent rows through the buffer area array in the predetermined direction by a pulse of a third clock so that the charge contents of a last row of gates of the buffer area array are transferred in parallel to a row of gates in a readout register; (e) shifting out the charge contents of the gates of the readout register serially to an output of the CCD as controlled by the pulses of a fourth clock; (f) thereafter, repeating steps (d) and (e) for each row of the predetermined number of adjacent rows of stored charge content of the buffer area array transferred from the storage area array in step (d); and (g) repeating steps (c)–(f) for each predetermined number of adjacent rows of a set of predetermined number of adjacent rows of the storage area array.

DETAILED DESCRIPTION OF THE INVENTION

Figure 1:
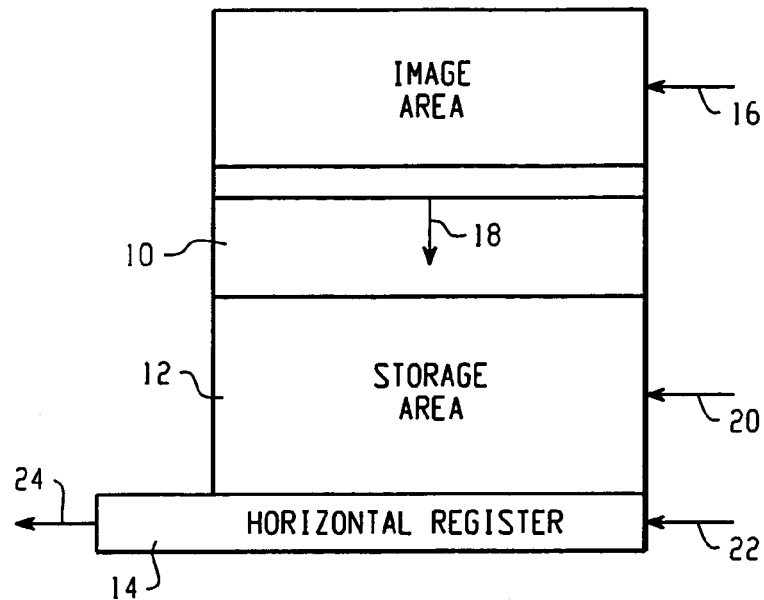
FIG. 1 is a sketch of a typical CCD detector used for image applications.
Figure 2:
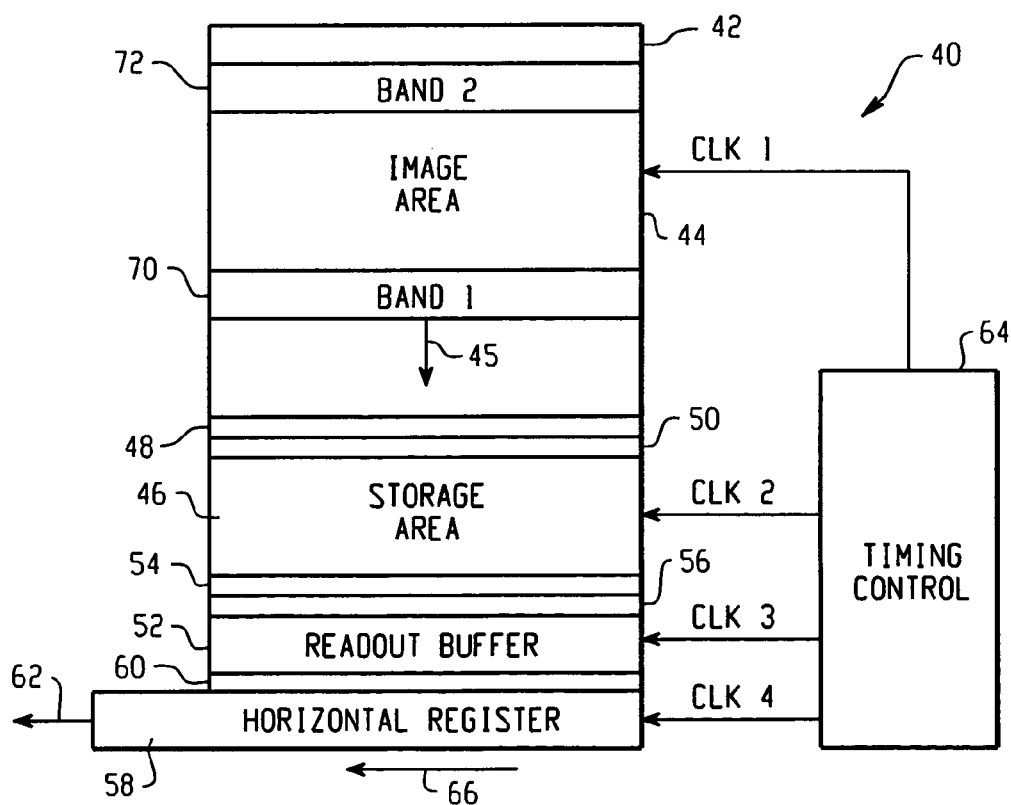
FIG. 2 is a sketch of a CCD image detector suitable for embodying the principles of one aspect of the present invention.

A charge coupled device (CCD) image detector 40 suitable for embodying the principles of the present invention is shown by the schematic of FIG. 2. Referring to FIG. 2, a CCD 42 includes an image area 44 of an array of rows of gates, each gate of the image area array 44 being operative to collect and store a charge content representative of a picture element (pixel) of an image. The rows of gates of the image area 44 being operative concurrently by a first clock signal CLK1 to transfer in parallel the charge contents of the gates of each row to the gates of an adjacent row in a predetermined direction noted by arrow 45 through the image area 44. The term gate as used herein means a circuit configuration comprising a plurality of capacitors electrically controllable by a plurality of phases of a clock pulse. Accordingly, any circuit configuration may be used as a gate for the embodiment without deviating from the broad principles of the present invention. Also, a clock pulse of a clock signal as described herein may comprise a plurality of phases consistent with controlling the charge storage and transfer operations of the gate circuit configuration being used in the CCD.

The CCD 42 also includes a storage area 46 of an array of rows of gates, each gate of the storage area array 46 being operative to store a charge content. The rows of gates of the storage area 46 being operative concurrently by a second clock signal CLK2 to transfer in parallel the charge contents of the gates of each row to the gates of an adjacent row in the predetermined direction through the storage area 46. The storage area array of rows 46 is disposed in the CCD 42 such that a first row 48 of the image area array of rows 44 is adjacent a last row 50 of the storage area array of rows 46 to accommodate a transfer in parallel of the charge contents of the gates of the first row 48 of the image area 44 to the gates of the last row 50 of the storage area 46, wherein the image and storage areas are operative by the first and second clock signals, CLK1 and CLK2, respectively, to transfer the charge contents of the rows of the image area array 44 to rows of the storage area array 46.

The CCD 42 further includes a buffer area 52 of an array of rows of gates, each gate of the buffer area array 52 being operative to store a charge content. The rows of gates of the buffer area 52 are operative concurrently by a third clock signal CLK3 to transfer in parallel the charge contents of the gates of each row to the gates of an adjacent row in the predetermined direction through the buffer area 52. The buffer area array of rows 52 is disposed in the CCD 42 such that a first row 54 of the storage area array of rows 46 is adjacent a last row 56 of the buffer area array of rows 52 to accommodate a transfer in parallel of the charge contents of the gates of the first row 54 of the storage area 46 to the gates of the last row 56 of the buffer area 52, wherein the storage and buffer areas are operative by the second and third clock signals, CLK2 and CLK3, respectively, to transfer the charge contents of the rows of the storage area array 46 to rows of the buffer area array 52. The size of the buffer area array 52 being optimized substantially by number of rows in relation to the rows of the image area array for charge transfer efficiency performance. This optimization process will be more fully described by way of example herein below.

Further included as part of the CCD 42 is a readout or horizontal register 58 of a row of gates, each gate of the readout register 58 being operative to store a charge content. The readout register 58 is disposed in the CCD 42 such that a first row 60 of the buffer area array of rows 52 is adjacent the row of the readout register 58 to accommodate a transfer in parallel of the charge contents of the gates of the last row 60 of the buffer area 52 to the gates of the readout register 58 as controlled solely by the third clock signal CLK3. The row of gates of the readout register 58 being operative concurrently by a fourth clock signal CLK4 to transfer serially the charge contents of the gates thereof through the register 58 in a predetermined direction to an output signal line 62 of the detector 40.

In one embodiment, the image area 44 includes 512 rows of 512 gates per row and the charge content of each gate represents a picture element (pixel) of an image frame. The storage area 46 and the buffer area 52 of this embodiment, together include a like number of rows and gates per row to permit the charge contents of the image area 44 which represent the pixels of a frame image to be stored in a one-to-one manner in the gates of the storage area 46 and buffer area 52. The image area 44 and likewise, the storage area 46/buffer area 52 may be divided into a plurality of bands of adjacent rows like the bands 70 and 72, for example, wherein each band of the plurality, which may be on the order of six, for example, includes a predetermined number of rows which may be on the order of 16, for example. Accordingly, for a band readout application, the buffer area 52 may be optimized substantially in size to have an equal number of rows to the predetermined number of rows of the bands. In this example, the buffer area 52 will be sized to have 16 rows. An exemplary operation of a band readout application will be described herein below in connection with the flowcharts of FIGS. 3A–3B.

For a full image frame readout application, the full frame image of the image area 44 and likewise, the storage area 46/buffer area 52 may be divided into a plurality of adjacent bands, each of a predetermined number of rows which may be on the order of 32, for example. Accordingly, for a full frame image readout application, the buffer area 52 may be optimized substantially in size to have a number of rows equal to the square root of the number of rows of the image area 44 rounded up to the nearest integer. For example, if the entire image frame includes 512 rows of gates, then the image area will have 512 rows of gates and accordingly, a substantially optimum buffer area 52 is sized to have 23 rows. An exemplary operation of a full image frame readout application will be described herein below in connection with the flowchart of FIG. 4.

The image detector 40 further comprises a timing controller 64 for controlling the operation of the first, second, third and fourth clock signals CLK1, CLK2, CLK3 and CLK4, respectively. In one aspect of the present invention, the timing controller 64 operates the clock signals CLK1, CLK2, CLK3 and CLK4 in a predetermined sequence to purge the CCD 42 of the image detector 40 of charge contents. In another aspect of the present invention, the timing controller 64 operates the clock signals CLK1, CLK2, CLK3 and CLK4 in a another predetermined sequence to effect a readout of the charge content of a plurality of bands of rows of gates. In still another aspect of the present invention, the timing controller 64 operates the clock signals CLK1, CLK2, CLK3 and CLK4 in yet another predetermined sequence to effect a readout of the charge content of an entire image frame. More specifically, the timing controller 64 is operative to: (1) control the first, second and third clock signals CLK1, CLK2 and CLK3 concurrently to transfer the charge contents of the rows of the image area array 44 to rows of the storage area array 46 and buffer area array 52, (2) control the second and third clock signals CLK2 and CLK3 concurrently to transfer the charge contents of the rows of the storage area array 46 to rows of the buffer area array 52, (3) control the third clock signal CLK3 to transfer in parallel the charge contents of the first row 60 of the buffer area 52 to the readout register 58, and (4) control the fourth clock signal CLK4 to transfer serially the charge contents of the gates of the readout register 58 through the register 58 in a predetermined direction noted by the arrow 66 to the output signal line 62. These and other aspects of the present invention will be explained in greater detail in the description found herein below.

Figure 3:
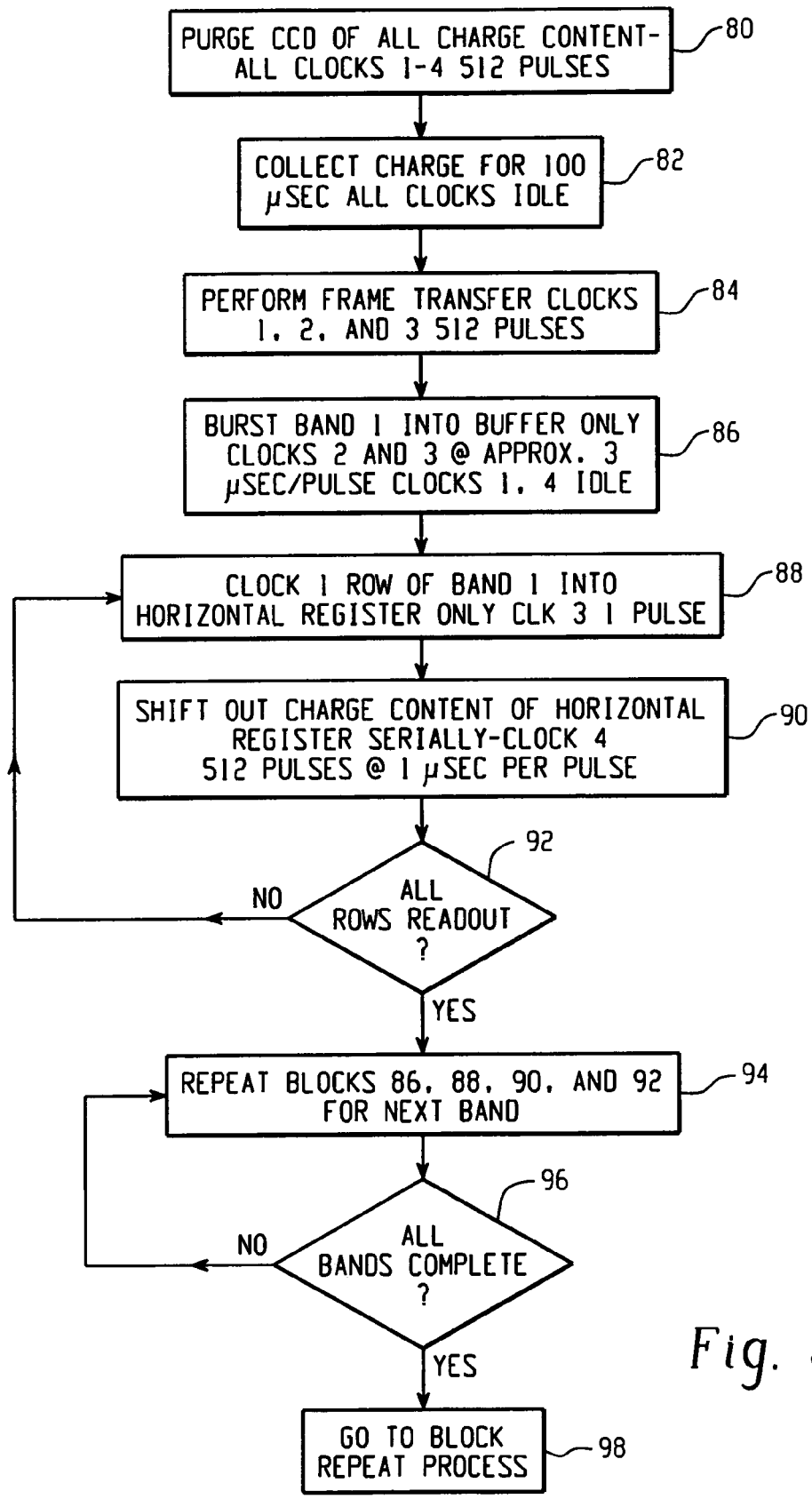
FIGS. 3A and 3B depict a flow chart of method steps for operating the CCD image detector of FIG. 1 in accordance with another aspect of the present invention.
Figure 3A:
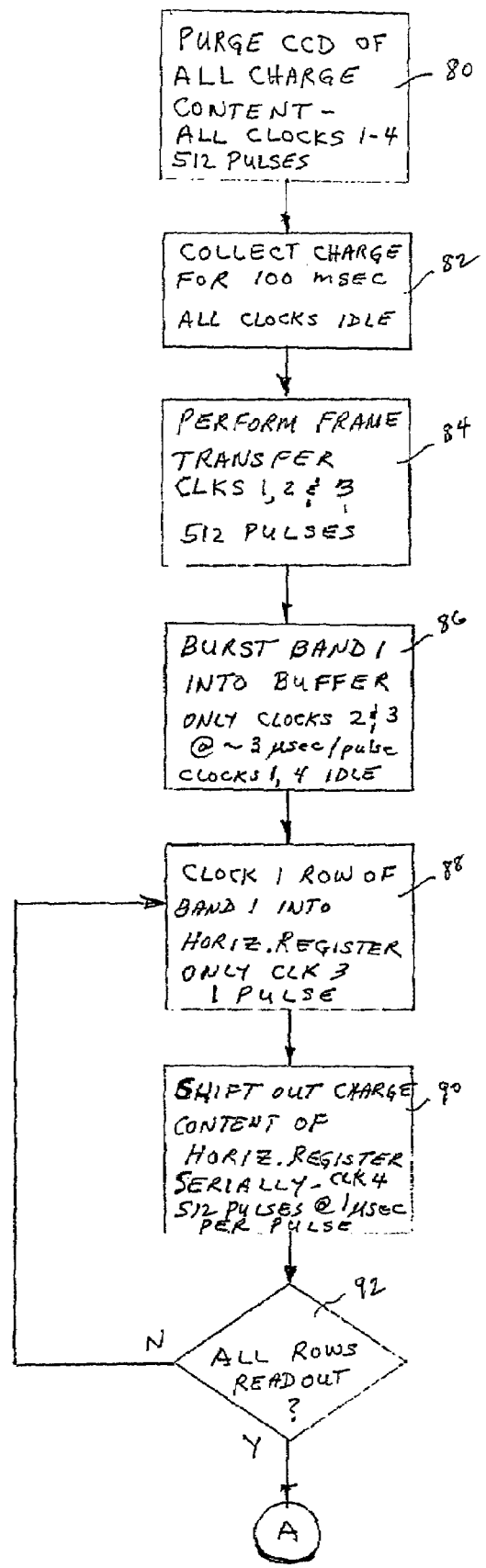
Figure 3B:
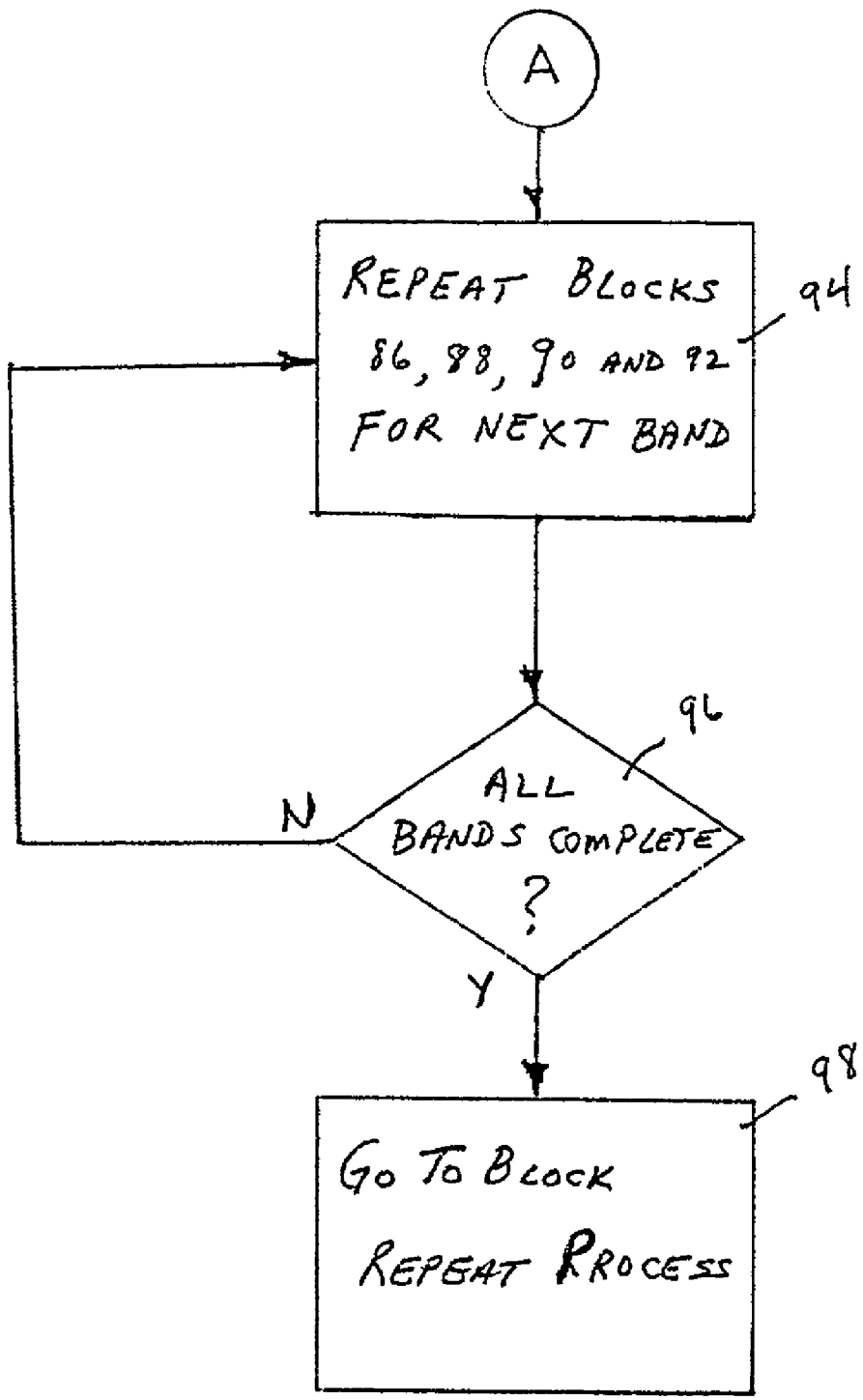

The timing controller 64 may be embodied as a hardwired circuit using interconnected logic gates operated in a predetermined combinational and/or sequential manner, or as a programmable read only memory or gate array, or as a programmed microcontroller, for example. In either case, the logic flow of the timing controller 64 defines a method of operating the CCD 42 which may be described in connection with steps of a flow chart. An exemplary logic flow chart for the operation of the CCD 42 for a band read out application is shown in FIGS. 3A–3B. As described herein above, for a band readout application, the image and storage areas 44 and 46, respectively, are divided into a set or plurality of bands wherein each band includes a predetermined number of adjacent rows of charge content. Referring to FIGS. 3A–3B, in the initial step or block 80, the CCD 42 is purged of charge content utilizing all clock signals. While the present embodiment includes a purging step, it is understood that in some applications, no separate purge cycle prior to the step of integration or charge collection is used. Rather, a frame transfer may define the step of integration without a charge purge.

A suitable method of purging the CCD 42 includes the steps of: (a) transferring the stored charge contents of the image area array 44 to the storage area and buffer area arrays, 46 and 52, respectively, controlled by a burst of pulses from clock signals CLK1, CLK2, and CLK3 wherein each pulse transfers in parallel the stored charge contents of gates between adjacent rows through the image and storage areas in the predetermined direction 45, whereby the gates of the image area array become substantially void of charge content; (b) thereafter, transferring the charge contents of a predetermined number of adjacent rows of the storage area array 46, like 23 rows, for example, to a like number of adjacent rows of the buffer area array 52 controlled by a burst of pulses from clock signals CLK2 and CLK3 wherein each pulse controls the transfers in parallel of the stored charge contents of gates between adjacent rows through the storage and buffer areas in the predetermined direction 45, whereby the gates of the predetermined number of adjacent rows of the storage area 46 become substantially void of charge content; (c) transferring in parallel the charge contents of adjacent rows through the buffer area array 52 in the predetermined direction 45 by a pulse of the clock signal CLK3 so that the charge contents of the first row of gates 60 of the buffer area array 52 are transferred in parallel to the row of gates in the readout register 58; (d) shifting out the charge contents of the gates of the readout register 58 serially to the output 62 of the CCD 42 as controlled by the pulses of the clock signal CLK4; (e) thereafter, repeating steps (c) and (d) for each row of the predetermined number of adjacent rows of stored charge content of the buffer area array 52 transferred from the storage area array in step (b); and (f) repeating steps (b)–(e) until all of the gates of the remaining areas of the CCD are void of charge content. For example, if each time step (b) is performed, 23 rows are burst transferred from the storage area 46 to the buffer area 52, then step (b) will be repeated 23 times for the storage area 46 to be void of charge contents according to this exemplary method.

After the CCD 42 has been purged of charge content in step or block 80, charge is collected and stored in the gates of the image area 44 for a predetermined period of time, like 100 milliseconds, for example, in step 82. During this time period, all clock signals remain idle. In the next step 84, the stored charge contents of the image area array 44 are transferred to the storage area array 46 and buffer area array 52 controlled by a burst of pulses from clock signals CLK1, CLK2 and CLK3 wherein each pulse of the aforementioned clock signals which may be on the order of three microseconds, for example, controls the transfers in parallel of the stored charge contents of gates between adjacent rows through the image and storage/buffer areas in the predetermined direction 45. In step 86, the charge contents of adjacent rows of the storage area array 46 are transferred to a like number of adjacent rows of a buffer area array 52 controlled by a burst of pulses from clocks CLK2 and CLK3 wherein each pulse which also may be on the order of three microseconds, for example, controls the transfers in parallel of the stored charge contents of gates between adjacent rows through the storage and buffer areas in the predetermined direction 45. The step 86 will continue until the first band, like band 70, for example, is transferred and stored in the buffer area 52. During the burst transfer of step 86, clock signals CLK1 and CLK4 may remain idle.

In block 88, the charge contents of adjacent rows of the buffer area 52 are transferred in parallel through the buffer area array in the predetermined direction 45 by a pulse of the clock signal CLK3 so that the charge contents of the first row of gates 60 of the buffer area array 52 are transferred in parallel to the row of gates in the readout register 58. Then, in step 90, the charge contents of the gates of the readout register 58 are shifted serially to the output 62 as controlled by the pulses of the clock signal CLK4, which may be on the order of one microsecond each, for example. Thereafter, in step 92, steps 88 and 90 are repeated until each row of the first band of adjacent rows of stored charge content of the buffer area array 52 is transferred to and readout through the register 52. Then, in steps 94 and 96, steps 86, 88, 90, and 92 are repeated in sequence for each band of adjacent rows of the storage area 46 until all of the bands of charge content of the plurality of bands are shifted out of the CCD 42. Thereafter, in step 98 the method is repeated for a new charge content of the set of bands. The method steps may be repeated periodically for some applications.

Figure 4:
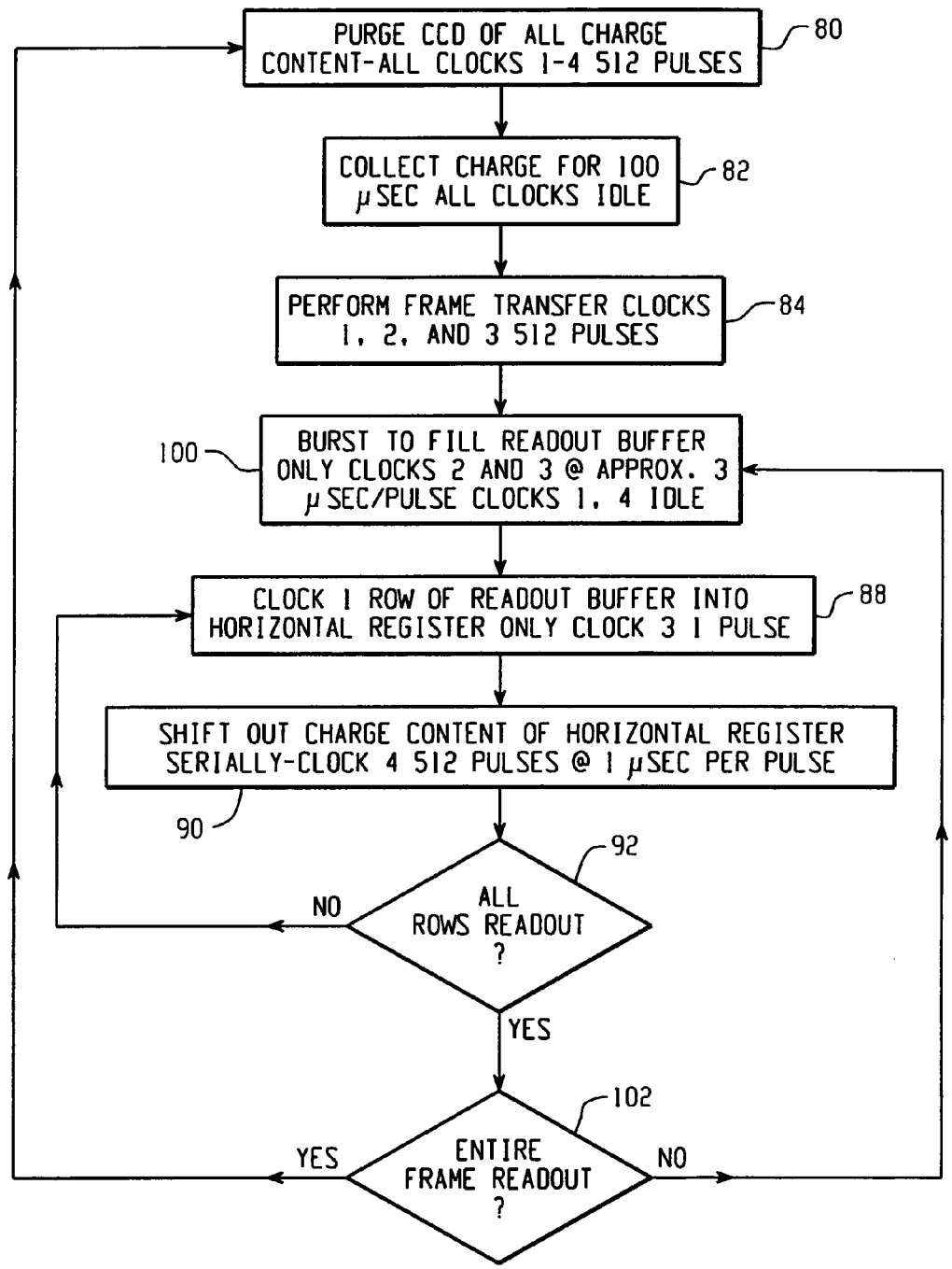
FIG. 4 depicts a flow chart of method steps for alternately operating the CCD image detector of FIG. 1 in accordance with another aspect of the present invention.

An exemplary logic flow chart for the operation of the CCD 42 for a frame image read out application is shown in FIG. 4. As described herein above, for a frame image readout application, the image and storage/buffer areas 44 and 46/52, respectively, are divided into a plurality of adjacent bands wherein each band includes a predetermined number of adjacent rows of charge content. If the buffer area 52 is optimized substantially for a frame image of 512 rows, for example, by taking the square root of the number of rows and rounding it up to the nearest integer. The number of rows in the buffer area will be 23 and for optimization purposes, the predetermined number or rows in each adjacent band of the frame image will be set at 23 rows. Thus, the image and storage/buffer areas may be divided into 23 bands, 22 of which containing 23 adjacent rows and 1 of which containing 6 adjacent rows, to render a total of 512 rows or the entire frame image.

In those steps of the exemplary method of FIG. 4 that remain substantially the same as described for the method of FIGS. 3A–3B, like reference numerals are used and no further description will be provided. Referring to FIG. 4, the only steps that are different from the band readout method of FIGS. 3A–3B are the steps 100 and 102. Steps 80, 82, and 84 are performed in sequence bring the operational method flow to step 100 in which clock signals CLK2 and CLK3 are controlled to each produce a burst of 23 pulses to transfer the first band of 23 adjacent rows from the storage area 46 to the buffer area 52 which is sized or set to 23 rows. Thereafter, steps 88, 90 and 92 are performed in sequence to transfer the charge content of the 23 rows of the first band out from the CCD via register 58. Next, in step 102, steps 100, 88, 90 and 92 are repeated for each band of rows until all of the bands or the entire frame image are readout from the CCD. Optimizing the rows of the buffer area 52 will reduce the number of times that the steps 100, 88, 90 and 92 are repeated. After performing step 102, the method may be repeated, preferably periodically.

In an alternate embodiment, the storage area 46 of 512 rows, for example, may be divided into 16 adjacent bands of 32 adjacent rows each whereby the number of rows of the buffer area 52 maybe set at 32 rows. In this example, the steps 100, 88, 90, and 92 are repeated 16 times for a complete frame image readout.

Note that according to the foregoing described exemplary methods, for a CCD image detector divided into a plurality of bands, adjacent or otherwise, the image and storage areas will incur only burst transfers controlled by pulses of approximately three microseconds each which are substantially less than the charge release time constant, thus spreading the release of any trapped charge in one or more gates over a large number of pixel charge contents. The buffer area 52 which may be optimized substantially for band and frame image readouts will incur interpulse period transfers of 512 microseconds, for example, ("slow transfer") when transferring the rows of charge content therefrom, but only for as many rows as are contained in each band, like 16 or 23 rows, for example. Note that, in the present embodiments, the storage area 46 is not clocked during the slow transfers of the buffer area 52. Only clock signal CLK3 is pulsed for these slow transfers. Storage area 46 will remain idle for the time period during which the charge contents of a band of rows is being transferred from the buffer area 52, which may be considered a slow transfer. However, the storage area 46 will incur such slow transfers only for the number of bands in a set which may be on the order of 23 or 6, for example.

Thus, in the present embodiments, the number of "slow" transfers are minimized and the number of "fast" or burst transfers are greater than in heretofore designs because the charge contents in the storage area 46 remain static during a readout of the buffer area 52. Accordingly, since the period of the "fast" transfers is much less than the trap release time constant, the release of trapped charge of a p-v trap will be spread over many charge contents or pixels with only a small amount of charge released in each following pixel in a charge transfer.

While the present invention has been described herein above in connection with a variety of embodiments, it is understood that the present embodiments are merely being presented by way of example and that the present invention should not be limited to any particular embodiment in the broadest sense. Rather, the present invention and its various aspects should be construed in breadth and broad scope in accordance with the recitation of the claims appended hereto.

What is claimed is:

1. A charge coupled device (CCD) image detector comprising:
   an image area of an array of rows of gates, each gate of said image area array being operative to collect and store a charge content representative of a picture element (pixel) of an image, said rows of gates of the image area being operative concurrently by a first clock signal to transfer in parallel the charge contents of the gates of each row to the gates of an adjacent row in a predetermined direction through said image area;
   a storage area of an array of rows of gates, each gate of said storage area array being operative to store a charge content, said rows of gates of the storage area being operative concurrently by a second clock signal to transfer in parallel the charge contents of the gates of each row to the gates of an adjacent row in the predetermined direction through said storage area, said storage area array of rows disposed in said CCD detector such that a first row of said image area array of rows is adjacent a last row of said storage area array of rows to accommodate a transfer in parallel of the charge contents of the gates of said first row of the image area to the gates of said last row of the storage area, wherein the image and storage areas are operative by the first and second clock signals, respectively, to transfer the charge contents of the rows of the image area array to rows of the storage area array;
   a buffer area of an array of rows of gates, each gate of said buffer area array being operative to store a charge content, said rows of gates of the buffer area being operative concurrently by a third clock signal to transfer in parallel the charge contents of the gates of each row to the gates of an adjacent row in the predetermined direction through said buffer area, said buffer area array of rows disposed in said CCD detector such that a first row of said storage area array of rows is adjacent a last row of said buffer area array of rows to accommodate a transfer in parallel of the charge contents of the gates of said first row of the storage area to the gates of said last row of the buffer area, wherein the storage and buffer areas are operative by the second and third clock signals, respectively, to transfer the charge contents of the rows of the storage area array to rows of the buffer area array;
   a readout register of a row of gates, each gate of said readout register being operative to store a charge content, said readout register disposed in said CCD detector such that a first row of said buffer area array of rows is adjacent the row of said readout register to accommodate a transfer in parallel of the charge contents of the gates of said first row of the buffer area to the gates of said readout register as controlled solely by the third clock signal, said row of gates of the readout register being operative concurrently by a fourth clock signal to transfer serially the charge contents of the gates thereof through said register in a predetermined direction to an output signal line; and
   a timing controller operative to perform the following tasks:
   (1) control the first and second clock signals concurrently to transfer the charge contents of the rows of the image area array to rows of the storage area array,
   (2) control the second and third clock signals concurrently to batch transfer the charge contents of a first band of adjacent rows of the storage area array to a like number of rows of the buffer area array,
   (3) control the third clock signal to transfer in parallel the charge contents of a first row of gates of said first band from the buffer area to the readout register,
   (4) control the fourth clock signal to transfer serially the charge contents of the gates of the readout register through the register in a predetermined direction to the output signal line,
   (5) repeat tasks (3) and (4) for the charge contents of another row of gates of said first band until the charge contents of all of the rows of gates of the first band have been transferred to the output signal line, and
   (6) repeat tasks (2) through (5) for each additional band of a plurality of bands of adjacent rows of the storage area until the charge contents of all of the bands of the plurality of bands of the storage area have been transferred to the output signal line.

2. The CCD image detector of claim 1 wherein the number of rows of the image area array is equal to the composite number of rows of the storage area array and buffer area array.

3. The CCD image detector of claim 1 wherein the number of rows of the buffer area array is equal to the square root of the number of rows of the image area array rounded up to the nearest integer value.

4. The CCD image detector of claim 1 wherein the number of rows of the buffer area array is equal to the number of a designated band of rows of the image area array.

5. The CCD image detector of claim 1 wherein the timing controller operates the first, second, third and fourth clock signals in a predetermined sequence to purge the CCD image detector of charge contents.

6. The CCD image detector of claim 1 wherein the timing controller operates the first, second, third and fourth clock signals in a predetermined sequence to effect a readout of the charge content of an image frame.

7. Method of operating a charge coupled device (CCD) as an image detector comprising the steps of:

(a) collecting and storing charge content in gates of an image area array of rows of gates for a predetermined period of time, said charge content of said gates of said image area array representative of a picture elements (pixels) of an image frame;

(b) transferring the stored charge contents of the image area array to a storage area array of rows of gates controlled by a burst of first clock pulses wherein each said first pulse controls the transfers in parallel of the stored charge contents of gates between adjacent rows through the image and storage areas in a predetermined direction and wherein said storage area is divisible into a plurality of bands of adjacent rows of gates;

(c) burst transferring the charge contents of a first band of the plurality of bands of adjacent rows of the storage area array to a like number of adjacent rows of a buffer area array of rows of gates controlled by a burst of second clock pulses wherein each said second pulse controls the transfers in parallel of the stored charge contents of gates between adjacent rows through the storage and buffer areas in the predetermined direction;

(d) transferring in parallel the charge contents of adjacent rows through the buffer area array in the predetermined direction by a pulse of a third clock so that the charge contents of a first row of gates of the first band are transferred in parallel to a row of gates in a readout register;

(e) shifting out the charge contents of the gates of the readout register serially to an output of the CCD as controlled by the pulses of a fourth clock;

(f) thereafter, repeating steps (d) and (e) for the charge contents of another row of gates of the first band of adjacent rows until the charge contents of all of the rows of gates of the first band have been shifted to the output of the CCD; and (g) repeating steps (c)–(f) for each additional band of the plurality of bands of adjacent rows of the storage area array until the charge contents of all of the bands of the plurality of bands of the storage area array have been shifted to the output of the CCD.

8. The method of claim 7 wherein the bands of the plurality are separated from each other in the storage area array.

9. The method of claim 7 including the steps of: setting equal the number of rows of each band of the plurality of bands; and setting the number of rows of the buffer area array equal to the number of rows of each band.

10. The method of claim 7 wherein the bands of the plurality are adjacent each other and include the entire storage area array.

11. The method of claim 10 wherein the entire storage area of 512 rows is divided into 16 adjacent bands of 32 rows each.

12. The method of claim 10 including the steps of: setting equal the number of rows of each band of the plurality of bands; setting the number of rows of the buffer area array equal to the number of rows of each band; and optimizing substantially the number of rows in each band and the number of times step c) is repeated.

13. The method of claim 10 including the step of setting the number of rows of the buffer area array equal to the square root of the number of rows of the image area array rounded up to the next highest integer.

14. The method of claim 7 including the step of purging the charge contents from the gates of the rows of the CCD prior to the execution of step (a).

15. The method of claim 7 including the step of repeating steps of (a) through (g) periodically.

\* \* \* \* \*